P. CONRAD.

Corn-Planter.

No. 46,083. Patented Jan. 31, 1865.

Witnesses:
C. L. Topliff
Theo Tusch

Inventor:
Peter Conrad
per Munn & Co
attorneys

UNITED STATES PATENT OFFICE.

PETER CONRAD, OF DORCHESTER, ILLINOIS.

COMBINED ROLLER AND CORN-PLANTER.

Specification forming part of Letters Patent No. 46,083, dated January 31, 1865.

*To all whom it may concern:*

Be it known that I, PETER CONRAD, of Dorchester, in the county of Macoupin and State of Illinois, have invented a new and Improved Combined Roller and Corn-Planter; and I do hereby declare that the following is a full, clear, and exact description thereof, which will enable others skilled in the art to make and use the same, reference being had to the accompanying drawings, forming part of this specification, in which—

Figure 1:
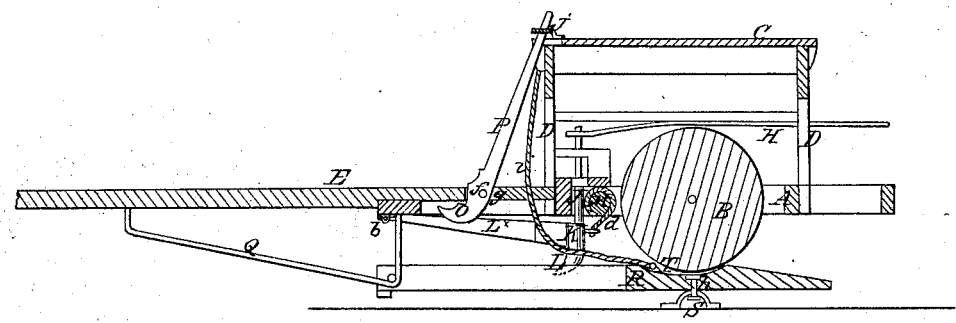
Figure 2:
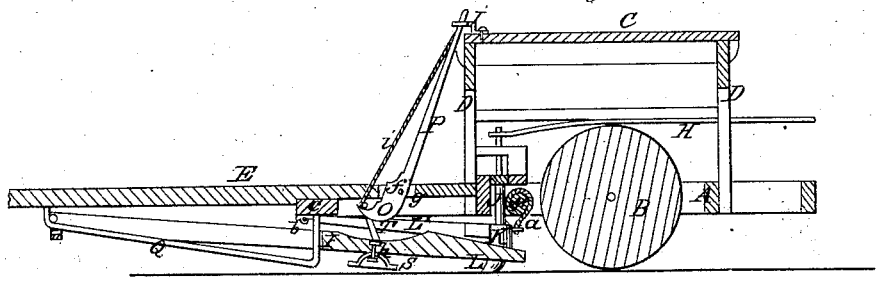
Figure 3:
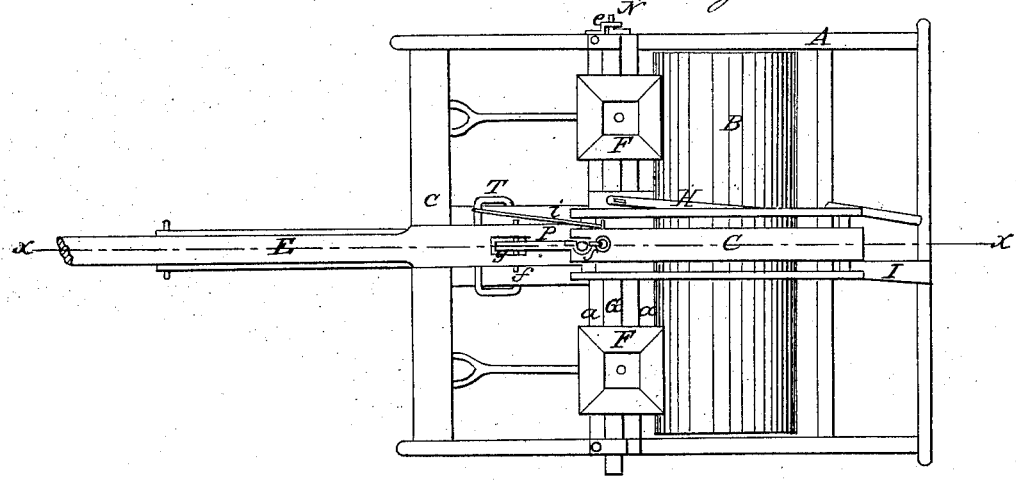

Figure 1 is a side sectional view of my invention, taken in the line $x\,x$, Fig. 3. Fig. 2 is also a side sectional view of the same, taken in the same line as Fig. 1, but showing a different portion of the parts; Fig. 3, a plan or top view of the same.

Similar letters of reference indicate like parts.

This invention has for its object the combining of a roller with a corn planting device in such a manner that the two devices will operate together much more perfectly than hitherto and several advantages obtained, which will be hereinafter set forth.

A represents a rectangular framing, in which a roller, B, is placed transversely, and C is the driver's seat, which is supported by standards D in a longitudinal position, with the framing above the roller B.

E is the draft-pole, and F F are two seed-hoppers, which are placed on the framing A, one at each side of the driver's seat C.

G is a seed-slide, which is fitted and works freely between transverse bars $a\,a$ in the framing A and underneath the hoppers F F, said seed-slide being provided with holes and arranged in the usual way for dropping seed from the hoppers. The seed-slide is operated through the medium of a lever, H, which extends back to a dropper's seat, I, at the rear of the framing.

The seed-hoppers are in front of the roller B, and seed-tubes J extend down from underneath the hoppers and fit in tubes K, which have shares or furrow-openers L at their lower ends. These tubes K are at the rear ends of bars $L^x$, the front ends of which are attached by hinges or joints $b$ to the front cross-piece, $c$, of the framing. The tubes K are connected by cords or chains $d$ to a shaft, M, placed transversely in the framing, and having a crank, N, at one end of it, by which the shaft may be turned for the purpose of raising and lowering the tubes, and the latter may be retained at the desired height by means of a catch, $e$, arranged so as to catch over the crank N. (See Fig. 3.) The seed, as it is dropped into the furrows made by the shares L, is covered and has the earth pressed firmly over it by the roller B.

The parts above described comprise all of the corn-planting mechanism.

O represents a hook, which has a handle or lever, P, attached, which works on a fulcrum-pin, $f$, in the rear of the draft-pole E, the hook passing down through a slot, $g$, in the former.

Q is an inclined rod at the under side of the draft-pole E, and on this inclined rod the front end of a bar, R, is fitted and allowed to slide freely. This bar R is slotted nearly its entire length, and it is broader at its rear than at its front part, the rear part being hollowed out, so that the roller B may rest upon it when the bar is in a backward position as far as the rod Q will allow it to be. (See Fig. 1.)

To the under side of the rear part of the bar R there is attached a horizontal wheel, S, which is placed loosely on an axis, $h$, and to the upper side of said bar there is secured a bail, T, which, when the bar R is drawn forward, is within reach of the hook O of lever P. The bar R is drawn forward, when desired, by means of a cord or chain, $i$, and when the hook O catches under the bale T, and the lever P is drawn back and secured by a catch, $j$, the bar will be elevated from the ground and free from the roller B, as shown in Fig. 2. This bar R, with its horizontal wheel, is designed to facilitate the turning of the machine at the ends of rows; and when it is necessary to turn the machine the driver liberates the upper end of the lever P, and thereby lets down the bar R, and the machine will be drawn along, so that the roller B will rest upon the rear of said bar, as shown in Fig. 1, and the machine then turns on the wheel S, which serves as a pivot. When the machine is turned the driver draws forward the bar R by means of the cord or chain $i$, and elevates said bar by means of the hook O, and the machine is again ready for work. Thus by this simple means I am enabled to turn the machine with the greatest facility, and the great objection to the combining of a roller with a corn-planter avoided.

I claim as new and desire to secure by Letters Patent—

1. The bar R, provided with the horizontal wheel S, and arranged, substantially as shown, in combination with the roller B, for the purpose herein set forth.

2. In combination with the bar R, wheel S, and roller B, a corn-planting device, substantially as set forth.

PETER CONRAD.

Witnesses:
JOHN B. SHEA,
SAML. BOOTH.